United States Patent
Seol et al.

(10) Patent No.: US 11,728,527 B2
(45) Date of Patent: *Aug. 15, 2023

(54) BATTERY PACK INCLUDING BATTERY CELLS CONNECTED TO A PRINTED CIRCUIT BOARD SUBSTRATE VIA FIRST AND SECOND ELECTRODE TABS

(71) Applicant: Samsung SDI Co., Ltd., Yongin-si (KR)

(72) Inventors: Jihwan Seol, Yongin-si (KR); Nohyun Kwag, Yongin-si (KR); Sanghoon Bae, Yongin-si (KR); Jooyul Lee, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 527 days.

This patent is subject to a terminal disclaimer.

(21) Appl. No.: 16/857,619

(22) Filed: Apr. 24, 2020

(65) Prior Publication Data

US 2020/0251702 A1    Aug. 6, 2020

Related U.S. Application Data

(63) Continuation of application No. 16/017,946, filed on Jun. 25, 2018, now Pat. No. 10,720,616.

(30) Foreign Application Priority Data

Sep. 22, 2017    (KR) ........................ 10-2017-0122874

(51) Int. Cl.
*H01M 10/48*    (2006.01)
*H01M 50/284*    (2021.01)
(Continued)

(52) U.S. Cl.
CPC ....... *H01M 10/441* (2013.01); *H01M 10/425* (2013.01); *H01M 10/482* (2013.01);
(Continued)

(58) Field of Classification Search
CPC ... Y02E 60/10; H01M 10/425; H01M 50/502; H01M 10/482; H01M 10/4257;
(Continued)

(56) References Cited

U.S. PATENT DOCUMENTS 7,671,565 B2    3/2010  Straubel et al.
7,692,405 B2    4/2010  Kim et al.
(Continued)

FOREIGN PATENT DOCUMENTS

CN    102197509 A    9/2011
CN    103325979 A    9/2013
(Continued)

OTHER PUBLICATIONS

KR Notice of Allowance dated Apr. 22, 2022 issued in corresponding KR Patent Application No. 10-2017-0122874, 2 pages.
(Continued)

*Primary Examiner* — Imran Akram
(74) *Attorney, Agent, or Firm* — Lewis Roca Rothgerber Christie LLP

(57)    ABSTRACT

A battery pack includes: a plurality of battery cells; a printed circuit board (PCB) substrate electrically connected to the plurality of battery cells and including first and second surfaces opposite each other; and first and second electrode tabs electrically connecting each of the plurality of battery cells and the PCB substrate and respectively connected to conductive pads that have different polarities and are located on the first surface of the PCB substrate. The battery pack has an improved structure for easily electrically connecting the battery cells.

19 Claims, 7 Drawing Sheets

(51) Int. Cl.
*H01M 50/50* (2021.01)
*H01M 50/519* (2021.01)
*H01M 50/548* (2021.01)
*H01M 10/44* (2006.01)
*H01M 10/42* (2006.01)
*H01M 50/559* (2021.01)
*H01M 50/262* (2021.01)
*H01M 50/213* (2021.01)
*H01M 50/536* (2021.01)
*H01M 50/533* (2021.01)
*H01M 10/6554* (2014.01)

(52) U.S. Cl.
CPC ....... *H01M 50/213* (2021.01); *H01M 50/262* (2021.01); *H01M 50/284* (2021.01); *H01M 50/50* (2021.01); *H01M 50/519* (2021.01); *H01M 50/533* (2021.01); *H01M 50/536* (2021.01); *H01M 50/548* (2021.01); *H01M 50/559* (2021.01); *H01M 10/6554* (2015.04); *H01M 2220/20* (2013.01)

(58) Field of Classification Search
CPC ............. H01M 50/284; H01M 50/503; H01M 50/519; H01M 50/528
See application file for complete search history.

(56) References Cited

U.S. PATENT DOCUMENTS

| | | | |
|---|---|---|---|
| 7,923,144 | B2 | 4/2011 | Kohn et al. |
| 8,241,772 | B2 | 8/2012 | Hermann et al. |
| 8,354,186 | B2 | 1/2013 | Muis |
| 8,389,139 | B2 | 3/2013 | Hermann et al. |
| 8,728,640 | B2 | 5/2014 | Byun et al. |
| 9,595,705 | B1 | 3/2017 | Buckhout |
| 10,270,080 | B2 | 4/2019 | Lee et al. |
| 2007/0222417 | A1 | 9/2007 | Kim et al. |
| 2008/0241667 | A1* | 10/2008 | Kohn ............... B60L 3/04 429/159 |
| 2009/0087694 | A1 | 4/2009 | Park |
| 2009/0297892 | A1* | 12/2009 | Ijaz ............... H01M 10/643 219/121.64 |
| 2010/0062329 | A1 | 3/2010 | Muis |
| 2010/0316893 | A1* | 12/2010 | Kim ............... H01M 50/178 429/7 |
| 2011/0052940 | A1* | 3/2011 | Koh ............... H01M 50/176 174/266 |
| 2011/0248719 | A1 | 10/2011 | Aoki |
| 2012/0148913 | A1 | 6/2012 | Chiba |
| 2013/0078485 | A1* | 3/2013 | Muis ............... H01M 10/48 429/7 |
| 2013/0252074 | A1 | 9/2013 | Hsiao et al. |
| 2013/0280587 | A1 | 10/2013 | Kim |
| 2014/0106200 | A1 | 4/2014 | Saiki |
| 2014/0120393 | A1 | 5/2014 | Desbois-Renaudin et al. |
| 2014/0178715 | A1 | 6/2014 | Koh |
| 2014/0212695 | A1 | 7/2014 | Lane et al. |
| 2017/0012331 | A1* | 1/2017 | Ng ............... H01M 50/572 |
| 2018/0054902 | A1* | 2/2018 | Lu ............... H01M 10/4257 |
| 2019/0097190 | A1* | 3/2019 | Seol ............... H01M 10/482 |

FOREIGN PATENT DOCUMENTS

| | | |
|---|---|---|
| CN | 103703873 A | 4/2014 |
| CN | 105390654 A | 3/2016 |
| GB | 2522443 A | 7/2015 |
| JP | 2010-282811 A | 12/2010 |
| KR | 10-2007-0096647 | 10/2007 |
| KR | 10-0929034 B1 | 11/2009 |
| KR | 10-2012-0076020 A | 7/2012 |
| KR | 10-1332960 B1 | 11/2013 |
| KR | 10-2014-0048209 | 4/2014 |
| KR | 10-2014-0081657 | 7/2014 |
| KR | 10-2017-0052381 | 5/2017 |
| WO | WO 2017/152140 A1 | 9/2017 |
| WO | WO 2017/152141 A1 | 9/2017 |

OTHER PUBLICATIONS

European Patent Office Action for corresponding European Patent Application No. 18 186 702.9, dated Sep. 27, 2019, 4 pages.
EPO Extended Search Report dated Jan. 22, 2019, for corresponding European Patent Application 18186702.9 (6 pages).
Office Action in corresponding China Application No. 201811091751.3, China Office Action dated Feb. 2, 2021 (8 pgs.).
English translation of Office Action in corresponding China Application No. 201811091751.3, China Office Action dated Feb. 2, 2021 (11 pgs.).

* cited by examiner

BATTERY PACK INCLUDING BATTERY CELLS CONNECTED TO A PRINTED CIRCUIT BOARD SUBSTRATE VIA FIRST AND SECOND ELECTRODE TABS

CROSS-REFERENCE TO RELATED APPLICATIONS

This application is a continuation of U.S. patent application Ser. No. 16/017,946, filed on Jun. 25, 2018, which claims priority to and the benefit of Korean Patent Application No. 10-2017-0122874, filed on Sep. 22, 2017 in the Korean Intellectual Property Office, the entire disclosures of both of which are incorporated herein by reference.

BACKGROUND

1. Field

Aspects of one or more embodiments relate to a battery pack.

2. Description of the Related Art

Unlike non-rechargeable primary batteries, secondary batteries are rechargeable. Secondary batteries are used as energy sources of devices, such as mobile devices, electric vehicles, hybrid vehicles, electric bicycles, or uninterruptible power supplies. Secondary batteries may be used individually, or secondary battery modules each including a plurality of secondary batteries connected as one unit may be used, according to the types of external devices using secondary batteries.

Unlike small mobile devices, such as cellular phones, operable for a certain period of time using a single battery, devices such as electric vehicles or hybrid vehicles having long operation times and consuming large amounts of electricity may use battery modules each including a plurality of batteries to handle problems relating to power and capacity, and the output voltages or currents of battery modules may be increased by adjusting the number of secondary batteries included in each battery module.

SUMMARY

According to an aspect of one or more embodiments, a battery pack including a plurality of battery cells has an improved structure for easily electrically connecting the battery cells.

Additional aspects will be set forth, in part, in the description which follows and, in part, will be apparent from the description, or may be learned by practice of the presented embodiments.

According to one or more embodiments, a battery pack includes: a plurality of battery cells; a printed circuit board (PCB) substrate electrically connected to the plurality of battery cells and including first and second surfaces opposite each other; and first and second electrode tabs electrically connecting each of the plurality of battery cells to the PCB substrate, the first and second electrode tabs being respectively connected to conductive pads having different polarities and located on the first surface of the PCB substrate.

For example, the conductive pads may form portions of conductive patterns of the PCB substrate forming a charge-discharge current path of the battery cell.

For example, the conductive patterns of the PCB substrate may include the conductive pads located on the first surface, a conductive section located on the second surface, and vias penetrating the PCB substrate to connect at least one of the conductive pads on the first surface to the conductive section on the second surface.

For example, the PCB substrate may include a rigid insulative substrate supporting the conductive patterns located on the first and second surfaces.

For example, the first and second electrode tabs may include: first and second coupling portions respectively coupled to first and second electrodes of the battery cell; and first and second conductive portions extending from the first and second coupling portions toward the PCB substrate and respectively connected to the conductive pads having different polarities and located on the first surface.

For example, the first coupling portion may have a circular shape corresponding to the first electrode of the battery cell, and the second coupling portion may have a circular arc shape corresponding to the second electrode of the battery cell.

For example, the first and second electrode tabs may further include first and second fixing portions extending from the first and second coupling portions and respectively coupled to different isolated pads located on the first surface of the PCB substrate.

For example, the isolated pads may not form the charge-discharge current path of the battery cell.

For example, the first conductive portion and the first fixing portion may radially extend from mutually-facing positions of the first coupling portion toward the PCB substrate.

For example, the first conductive portion and the first fixing portion may extend from opposite positions of the first coupling portion and may extend toward the PCB substrate in opposite directions.

For example, the first electrode tab may further include a deformation portion including one or more bent portions on at least one of the first conductive portion and the first fixing portion.

For example, the first conductive portion and the first fixing portion may extend to and may coupled to the first surface of the PCB substrate through an opening of the PCB substrate through which the first and second electrodes of the battery cell are exposed.

For example, the second conductive portion and the second fixing portion may extend from mutually-facing positions of the second coupling portion toward the PCB substrate.

For example, the second electrode tab may further include a third fixing portion extending from the second coupling portion and coupled to the first surface of the PCB substrate, the third fixing portion being between the second conductive portion and the second fixing portion.

For example, an additional isolated pad may be located on the first surface of the PCB substrate between the conductive pad to which the second conductive portion is connected and the isolated pad to which the second fixing portion is coupled, and the third fixing portion may be coupled to the additional isolated pad of the PCB substrate.

For example, the additional isolated pad may not form the charge-discharge current path of the battery cell.

For example, the second conductive portion, the second fixing portion, and the third fixing portion may extend from different positions of the second coupling portion toward the PCB substrate.

For example, the second electrode tab may further include a deformation portion including one or more bent portions on at least one of the second conductive portion, the second fixing portion, and the third fixing portion.

For example, the deformation portion may include deformation portions between the second coupling portion and each of the second conductive portion and the second fixing portion provided at mutually-facing positions, and no deformation portion may be provided between the second coupling portion and the third fixing portion that is between the second conductive portion and the second fixing portion.

For example, the second conductive portion, the second fixing portion, and the third fixing portion may extend to and may be coupled to the first surface of the PCB substrate through an opening of the PCB substrate through which the first and second electrodes of the battery cell are exposed.

For example, the first conductive portion and the first fixing portion of the first electrode tab, and the second conductive portion, the second fixing portion, and the third fixing portion of the second electrode tab may be coupled to the PCB substrate at non-overlapping positions around an opening of the PCB substrate.

For example, the first surface of the first and second surfaces of the PCB substrate which are opposite each other in a thickness direction of the PCB substrate may be more distant relative to the second surface from upper end portions of the battery cells on which first and second electrodes are located.

For example, the battery cells may include upper and lower end portions opposite each other, the PCB substrate may face the upper end portions of the battery cells on which first and second electrodes are located, and the battery pack may further include a cooling member at a position facing the lower end portions of the battery cells.

BRIEF DESCRIPTION OF THE DRAWINGS

These and/or other aspects will become apparent and more readily appreciated from the following description of some embodiments, taken in conjunction with the accompanying drawings in which.

DETAILED DESCRIPTION

Figure 1:
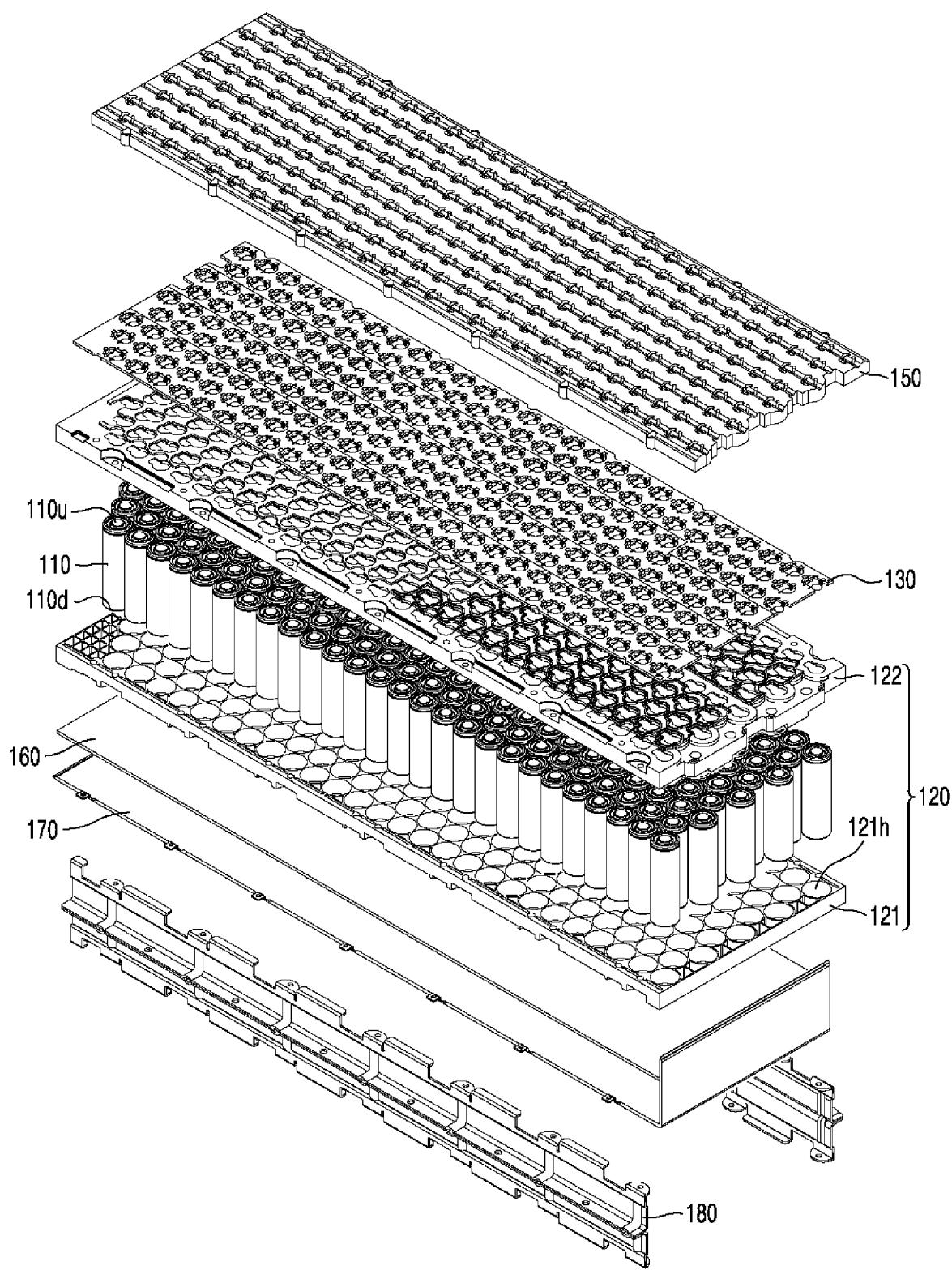
FIG. 1 is an exploded perspective view illustrating a battery pack according to an embodiment.

Reference will now be made in further detail to some embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description. As used herein, the term "and/or" includes any and all combinations of one or more of the associated listed items. Expressions such as "at least one of," when preceding a list of elements, modify the entire list of elements and do not modify the individual elements of the list.

Battery packs will now be described according to some embodiments with reference to the accompanying drawings.

Figure 2:
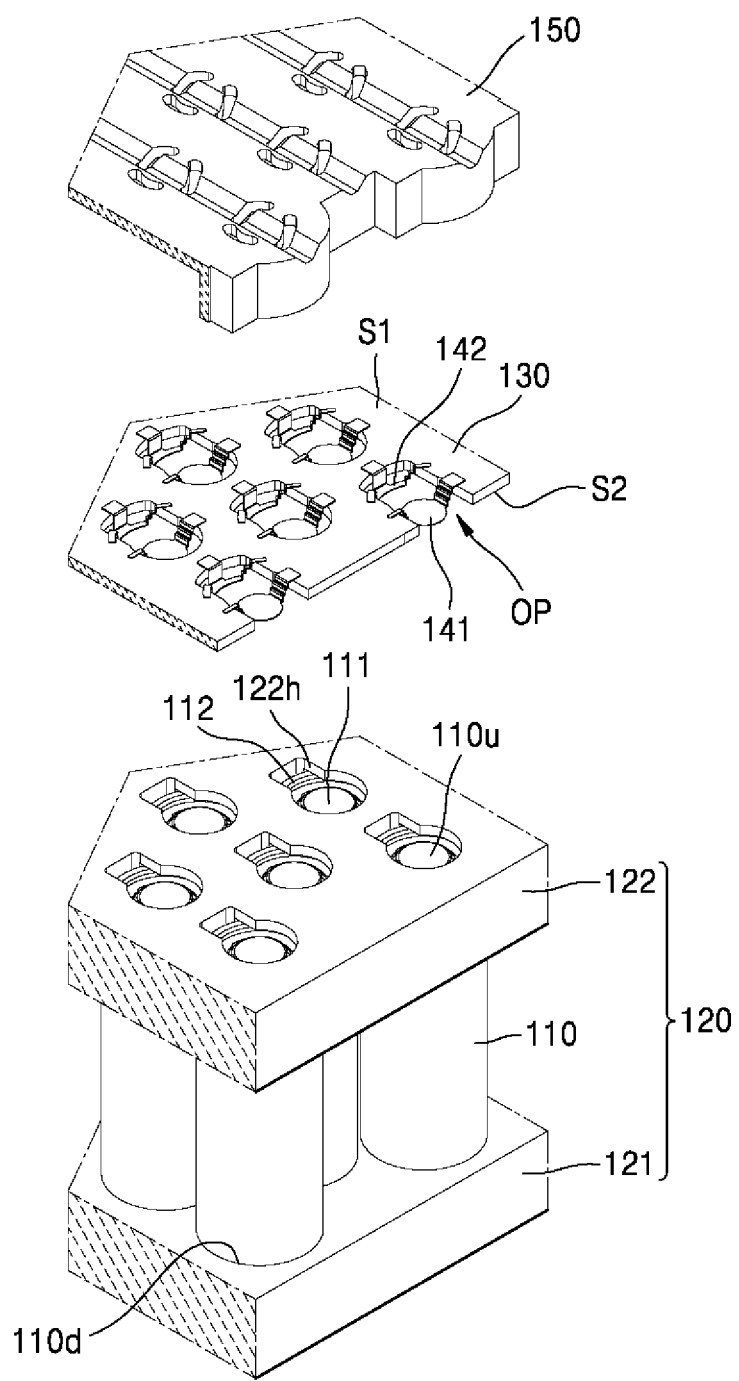
FIG. 2 is an exploded perspective view illustrating a portion of the battery pack illustrated in FIG. 1.
Figure 3:
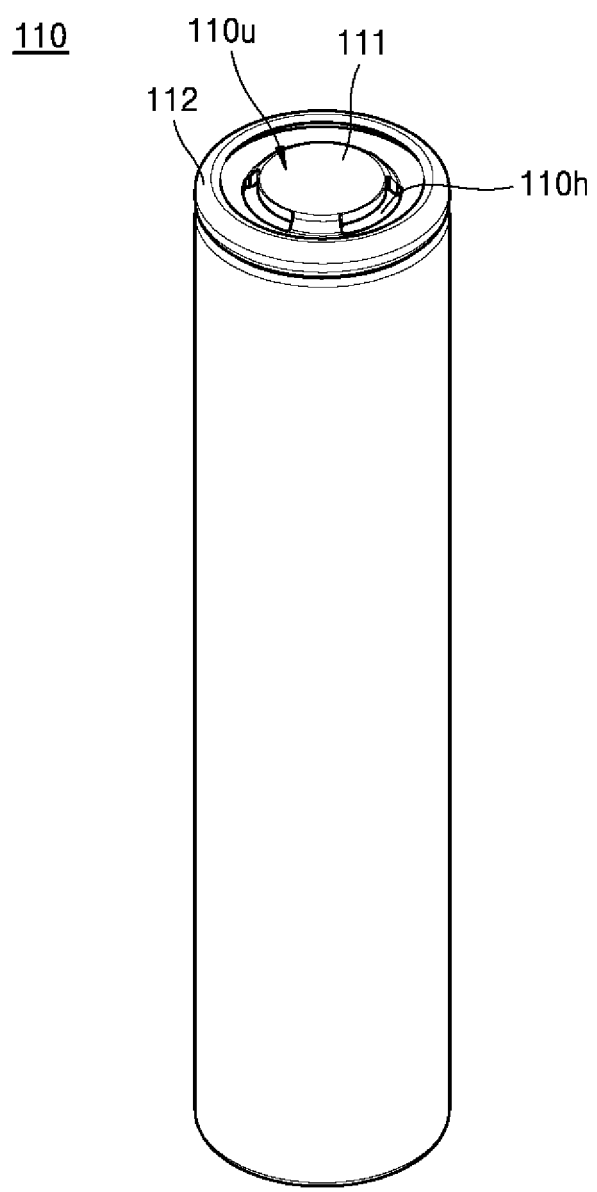
FIG. 3 is a perspective view illustrating a battery cell illustrated in FIG. 1.

FIG. 1 is an exploded perspective view illustrating a battery pack according to an embodiment. FIG. 2 is an exploded perspective view illustrating a portion of the battery pack illustrated in FIG. 1. FIG. 3 is a perspective view illustrating a battery cell illustrated in FIG. 1.

Referring to FIGS. 1 to 3, a battery pack according to an embodiment includes a plurality of battery cells 110, a printed circuit board (PCB) substrate 130 electrically connecting the battery cells 110 to each other and having first and second surfaces S1 and S2 opposite each other, and first and second electrode tabs 141 and 142 electrically connecting the battery cells 110 and the PCB substrate 130 to each other.

The battery pack may include the plurality of battery cells 110, and the battery cells 110 may be cylindrical batteries. For example, each of the battery cells 110 may have an upper end portion 110$u$ and a lower end portion 110$d$ in an axis direction (e.g., corresponding to a vertical direction) thereof, and a cylindrical surface may be included between the upper end portion 110$u$ and the lower end portion 110$d$. However, the battery cells 110 are not limited to the cylindrical shape. For example, the battery cells 110 may have another shape, such as an elliptical or polygonal shape.

The battery cells 110 may be arranged with axes (e.g., the vertical direction) of the battery cells 110 being parallel with each other, for example, in a matrix form in column and row directions. In an embodiment, the battery cells 110 having a cylindrical shape may be arranged in a zigzag pattern such that battery cells 110 may be arranged in valley regions defined by neighboring battery cells 110 to reduce empty space in the valley regions.

The battery cells 110 may be supported by a cell holder 120 and may be placed in position by the cell holder 120. In an embodiment, for example, the cell holder 120 includes sidewalls surrounding the upper end portions 110$u$ and the lower end portions 110$d$ of the battery cells 110 to place each of the battery cells 110 in position, and the battery cells 110 may be assembled respectively in proper positions defined by the sidewalls of the cell holder 120 such that the battery cells 110 may be structurally combined with each other through the cell holder 120. The cell holder 120 may include first and second holders 121 and 122 respectively arranged on lower and upper sides of the battery cells 110. For example, the first holder 121 may be placed to cover the lower end portions 110$d$ of the battery cells 110, and the second holder 122 may be placed to cover the upper end portions 110$u$ of the battery cells 110.

In an embodiment, a plurality of openings 122$h$ (refer to FIG. 2) may be formed in the second holder 122, and the upper end portions 110$u$ of the battery cells 110 may be exposed respectively through the openings 122$h$. As described later, both first and second electrodes 111 and 112 having opposite polarities may be provided on the upper end portion 110$u$ of each of the battery cells 110, and since the openings 122$h$ respectively corresponding to the battery cells 110 are formed in the second holder 122 placed to cover the upper end portions 110$u$ of the battery cells 110, all the first and second electrodes 111 and 112 provided on the upper end portions 110$u$ of the battery cells 110 may be exposed through the openings 122$h$ of the second holder 122 and may be connected to a charge-discharge current path through the PCB substrate 130 placed above the second holder 122.

In an embodiment, electrical connection for the first and second electrodes 111 and 112 having different polarities may be made through the upper end portions 110u of the battery cells 110, and openings 121h (refer to FIG. 1) may not be additionally formed in the first holder 121 provided on sides of the lower end portions 110d of the battery cells 110. In an embodiment, however, openings 121h may be additionally provided in the first holder 121 not for electrical connection but for heat dissipation, and the lower end portions 110d of the battery cells 110 may be exposed through the openings 121h.

According to an embodiment, in the axis direction (e.g., the vertical direction) of the battery cells 110, electrical connection may be made through sides of the upper end portions 110u, and heat dissipation may occur through sides of the lower end portions 110d. To this end, the PCB substrate 130 may be placed on the sides of the upper end portions 110u of the battery cells 110, that is, on an upper portion of the second holder 122, for electrical connection with the battery cells 110. In an embodiment, a cooling member 160 (refer to FIG. 1) may be placed on the sides of the lower end portions 110d of the battery cells 110, that is, on a lower portion of the first holder 121. The cooling member 160 may be thermally coupled to the sides of the lower end portions 110d of the battery cells 110, and, for example, the openings 121h may be formed in the first holder 121 to at least partially expose the lower end portions 110d of the battery cells 110, and sidewalls surrounding the lower end portions 110d of the battery cells 110 may be formed around the openings 121h. That is, the first holder 121 may include sidewalls surrounding the lower end portions 110d of the battery cells 110 to define proper positions of the battery cells 110, and at least portions of a bottom of the first holder 121 surrounded by the sidewalls may be opened to form the openings 121h, thereby providing efficient heat transfer to the cooling member 160 through the openings 121h of the first holder 121.

The cooling member 160 may have any of various shapes as long as the cooling member 160 dissipates heat from the battery cells 110, and may be of a solid plate type made of a highly conductive material or a block type having an internal flow path as a cooling medium path. In an embodiment, for example, the cooling member 160 may include an anodized aluminum plate.

The battery cells 110 of the battery pack may be structurally combined with each other through the cell holder 120 and may be electrically connected to each other through the PCB substrate 130. In an embodiment, the battery cells 110 combined with each other through the cell holder 120 and the PCB substrate 130 as described above may be accommodated in a housing including an upper cover 150, a lower cover 170, and side plates 180 placed between the upper cover 150 and the lower cover 170, and may thus be insulated from the external environment.

Referring to FIG. 3, among the upper end portion 110u and the lower end portion 110d in the axis direction (e.g., the vertical direction) of each of the battery cells 110, the upper end portion 110u may be provided with both the first and second electrodes 111 and 112. The first and second electrodes 111 and 112 having different polarities may be provided in different regions of the upper end portion 110u of the battery cell 110 so as to prevent or substantially prevent a short circuit between the first and second electrodes 111 and 112. In an embodiment, for example, the first electrode 111 may be provided having a circular shape in a center region of the upper end portion 110u of the battery cell 110, and the second electrode 112 may be provided having a ring shape at an edge region of the upper end portion 110u and may surround the first electrode 111. Since both the first and second electrodes 111 and 112 are arranged on the upper end portion 110u of the battery cell 110, all electrical connection of the first and second electrodes 111 and 112 may be made through the upper end portion 110u of the battery cell 110. Meanwhile, reference numeral 110h in FIG. 3 indicates a vent hole of the battery cell 110.

Figure 4:
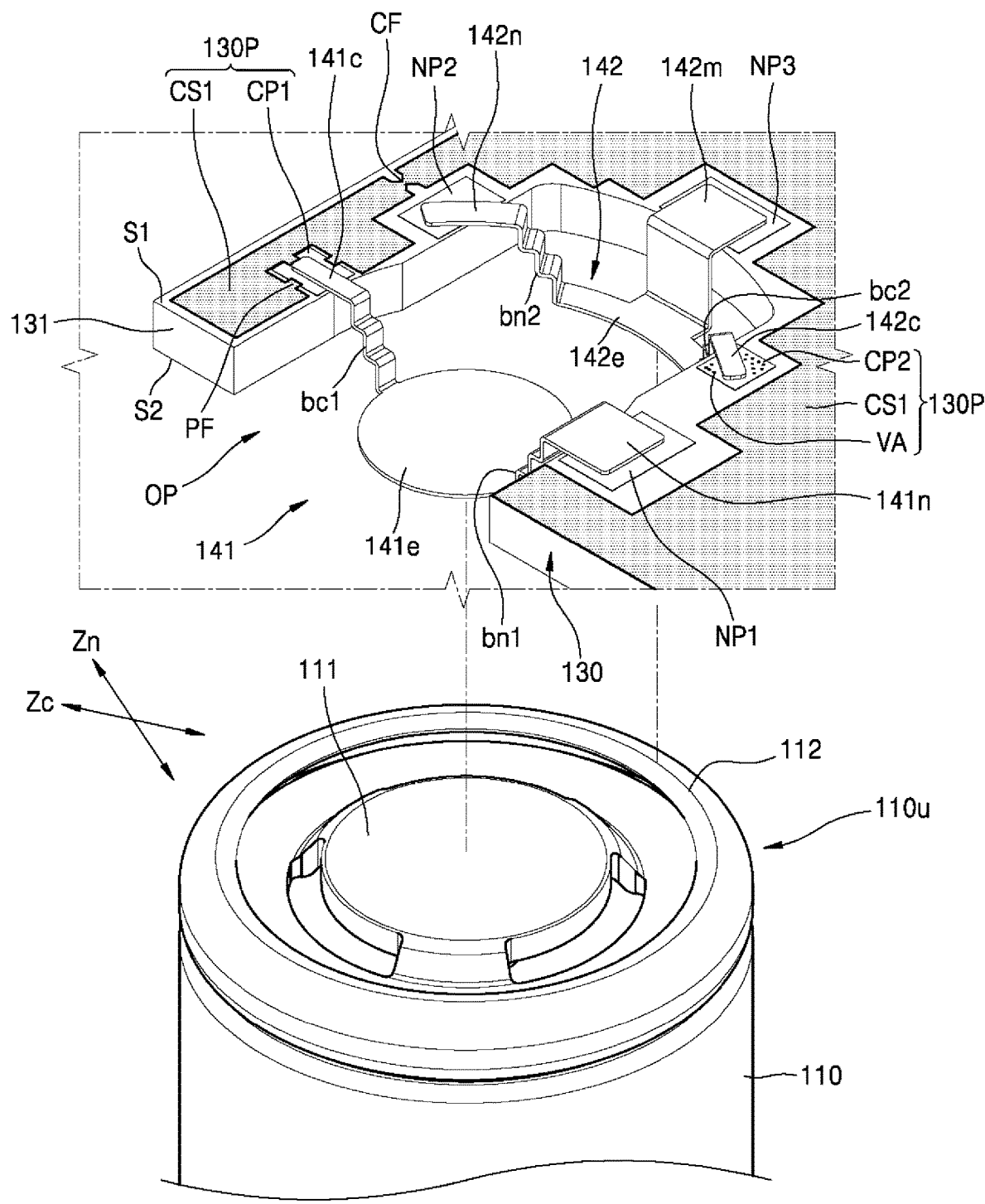
FIG. 4 is a perspective view illustrating first and second electrode tabs illustrated in FIG. 2.
Figure 5:
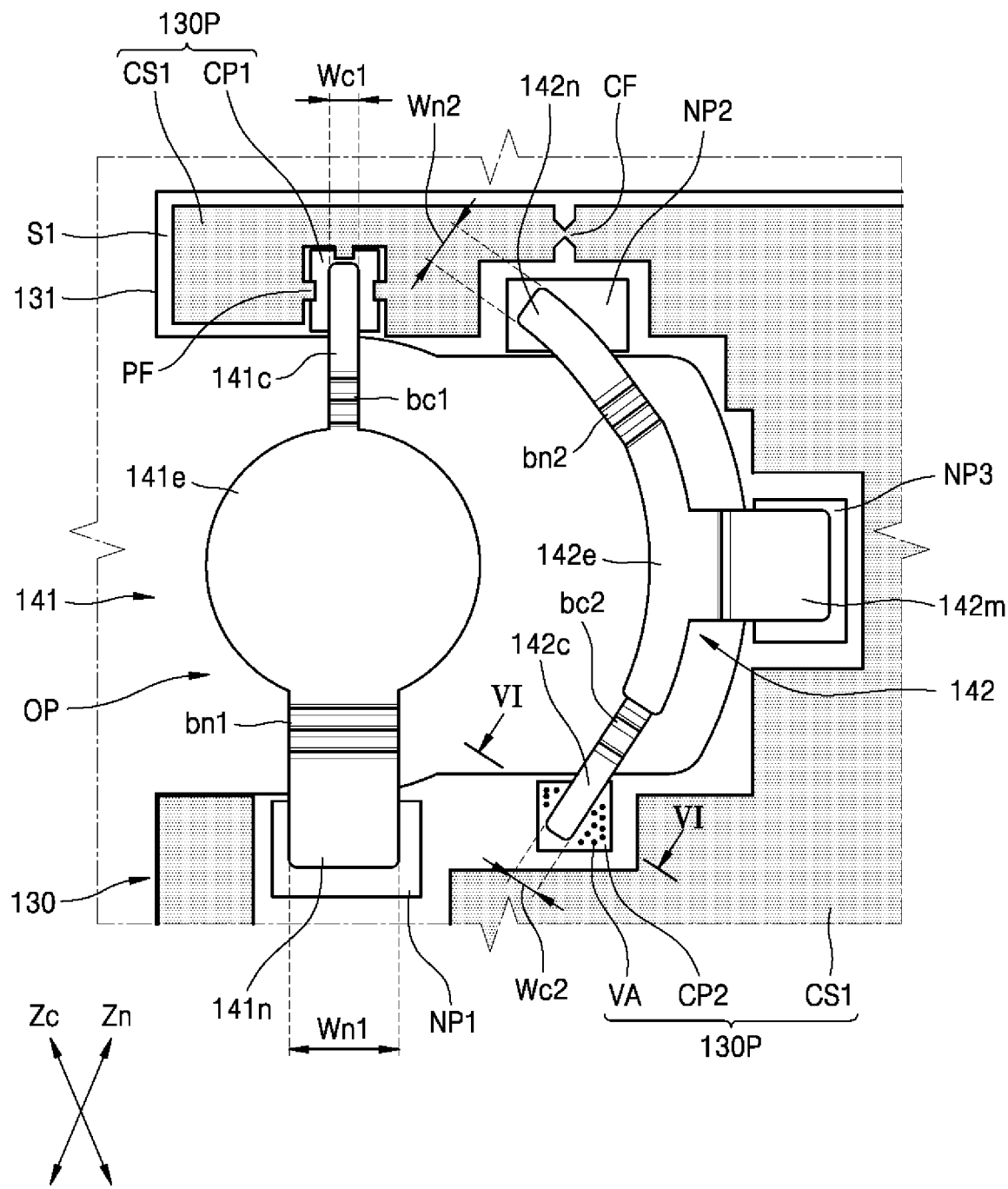
FIG. 5 is a view illustrating a first surface of a printed circuit board (PCB) substrate illustrated in FIG. 4.
Figure 6:
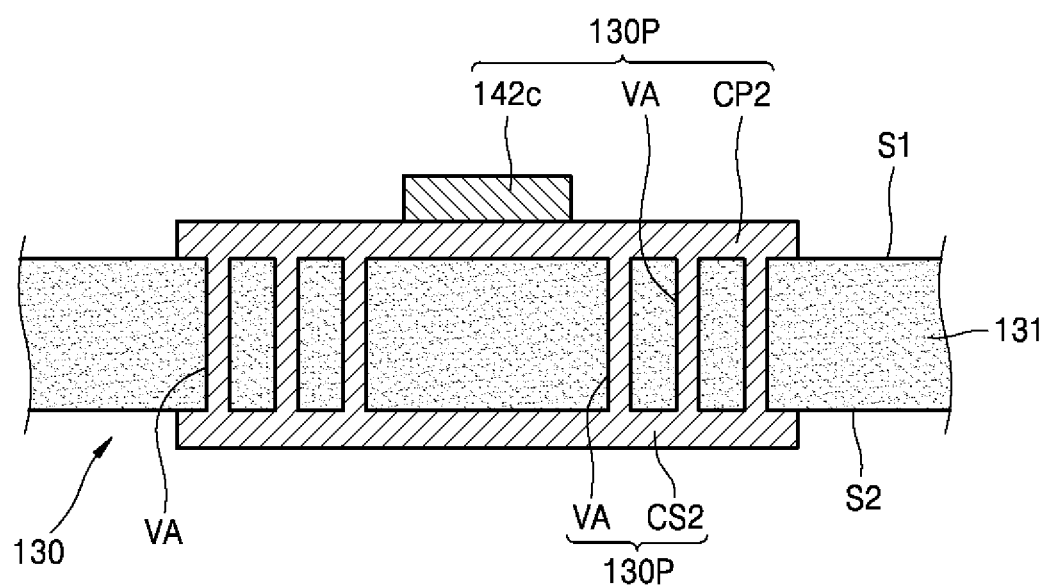
FIG. 6 is a cross-sectional view taken along the line VI-VI of FIG. 5.
Figure 7:
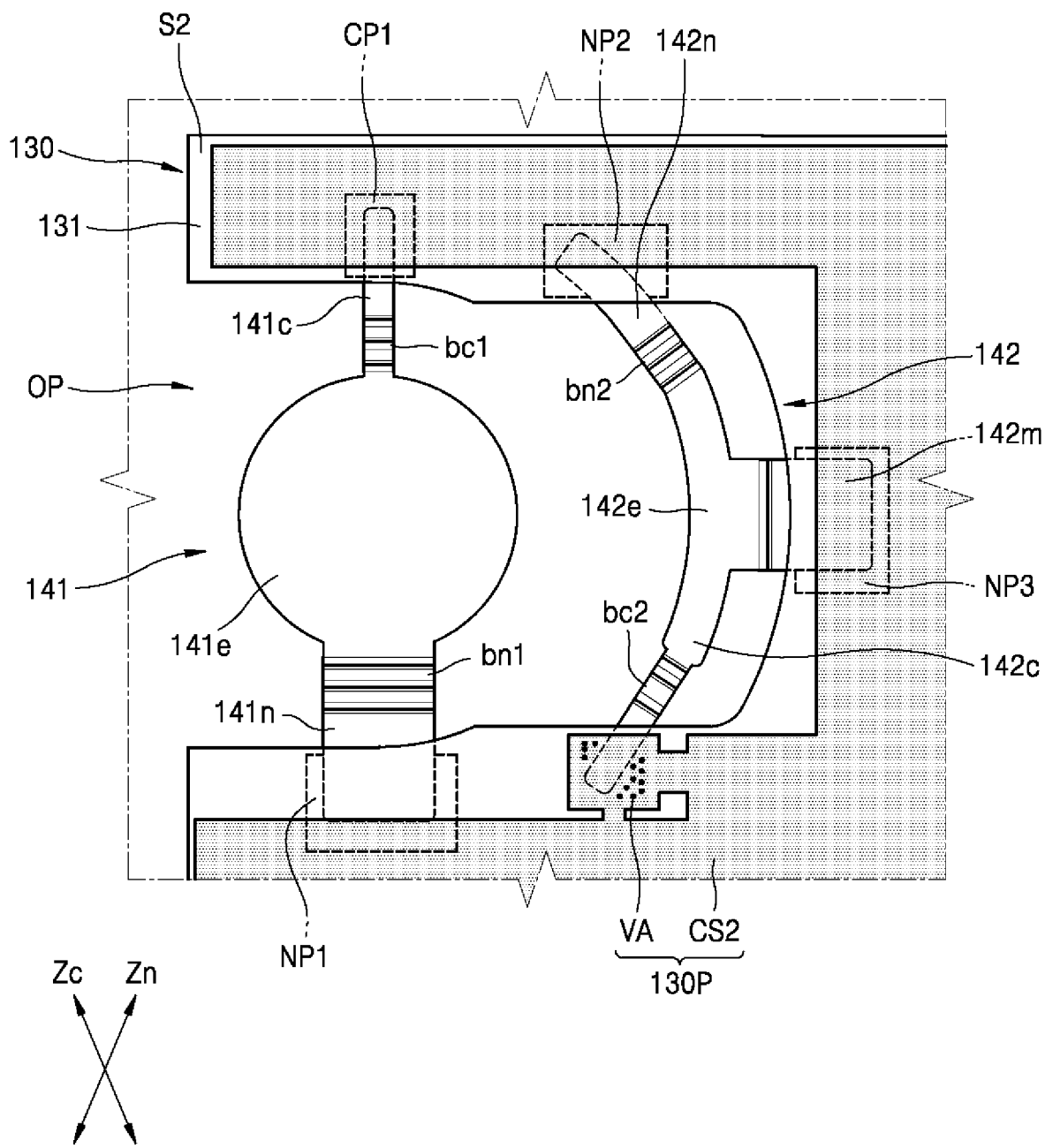
FIG. 7 is a view illustrating a second surface of the PCB substrate illustrated in FIG. 4.

FIG. 4 is a perspective view illustrating a pair of the first and second electrode tabs 141 and 142 shown in FIG. 2. FIG. 5 is a view illustrating the first surface S1 of the PCB substrate 130 shown in FIG. 4. FIG. 6 is a cross-sectional view taken along the line VI-VI of FIG. 5. FIG. 7 is a view illustrating the second surface S2 of the PCB substrate 130 shown in FIG. 4.

Referring to FIG. 4, the PCB substrate 130 may be placed on the upper end portions 110u of the battery cells 110. The PCB substrate 130 may define the electrical charge-discharge current path of the battery cells 110, and charge/discharge current collected from the battery cells 110 may be directed to an external circuit (not shown) through the PCB substrate 130. For example, the battery cells 110 of the battery pack may be structurally combined with each other through the cell holder 120 (refer to FIG. 2) and may be electrically connected to each other through the PCB substrate 130. For example, the PCB substrate 130 may connect the battery cells 110 to each other in series, parallel, or series-parallel and may provide wiring to connect the battery cells 110 electrically grouped as described above to an external circuit (not shown). To this end, a plurality of conductive patterns 130P may be provided on the PCB substrate 130. The conductive patterns 130P provided on the PCB substrate 130 will be described further later.

A plurality of openings OP respectively corresponding to the upper end portions 110u of the battery cells 110 may be formed in the PCB substrate 130. The PCB substrate 130 may be coupled to the first and second electrodes 111 and 112 of the battery cells 110 through the first and second electrode tabs 141 and 142 extending through the openings OP.

Referring to FIGS. 5 and 7, the PCB substrate 130 may be provided as a double-sided PCB and may include the first and second surfaces S1 and S2 opposite each other and the conductive patterns 130P provided on the first and second surfaces S1 and S2. However, the PCB substrate 130 is not limited to the double-sided PCB. That is, in an embodiment, the PCB substrate 130 may be provided as a single-sided PCB including the conductive patterns 130P selectively provided on one of the first and second surfaces S1 and S2.

The PCB substrate 130 may include an insulative substrate 131 and the conductive patterns 130P provided on the first and second surfaces S1 and S2 of the insulative substrate 131. In an embodiment, the PCB substrate 130 may be a rigid substrate including the insulative substrate 131 formed of a hard material. For example, the rigid substrate is different from a flexible substrate including a film-shaped soft material. Unlike a flexible substrate, the PCB substrate 130 being a rigid substrate may have a certain degree of structural rigidity and may function as a stable support structure when a thermal coupling process such as soldering or welding is performed for electrical connection with the battery cells 110.

The conductive patterns 130P of the PCB substrate 130 are provided for the flow of charge/discharge current between the battery cells 110 and an external circuit (not shown), and may be provided on the first and second surfaces S1 and S2 of the PCB substrate 130. For example, referring to FIG. 5, the conductive patterns 130P provided on the first surface S1 of the PCB substrate 130 may include first and second conductive pads CP1 and CP2, a first conductive section CS1 electrically connected to the first conductive pad CP1, and a connection portion PF connecting the first conductive pad CP1 and the first conductive section CS1 to each other. Referring to FIG. 7, the conductive patterns 130P provided on the second surface S2 of the PCB substrate 130 may include a second conductive section CS2 electrically connected to the second conductive pad CP2 of the first surface S1. In addition, referring to FIG. 6, the conductive patterns 130P of the PCB substrate 130 may include vias VA penetrating the PCB substrate 130 and connecting the first and second surfaces S1 and S2 to connect the second conductive pad CP2 provided on the first surface S1 to the second conductive section CS2 provided on the second surface S2. The vias VA may include a conductive material filling via holes formed through the PCB substrate 130 (or the insulative substrate 131). As described above, the PCB substrate 130 may be a double-sided PCB having the conductive patterns 130P on both the first and second surfaces S1 and S2 opposite each other. The conductive patterns 130P may be provided on both the first and second surfaces S1 and S2 to provide patterns on a same area or region of the PCB substrate 130, and the vias VA may be provided to electrically connect the conductive patterns 130P provided on both the first and second surfaces S1 and S2. In an embodiment, as illustrated in FIG. 5, the conductive patterns 130P may include a fuse portion CF configured to be melted and cut by Joule heating to interrupt overcurrent when overcurrent greater than a certain value (e.g., a set value) flows. The fuse portion CF may be relatively narrow compared to other portions of the conductive patterns 130P. In an embodiment, the connection portion PF connecting the first conductive pad CP1 and the first conductive section CS1 that are provided on the first surface S1 may also be relatively narrow compared to other portions of the conductive patterns 130P and may thus function as an overcurrent interrupting fuse by being melted and cut by Joule heating when overcurrent greater than a certain value (e.g., a set value) flows.

As described later, the first and second conductive pads CP1 and CP2 of the PCB substrate 130 may be respectively electrically connected to the first and second electrodes 111 and 112 of the battery cells 110, and the first and second electrode tabs 141 and 142 (refer to FIG. 4) may be placed between the first and second conductive pads CP1 and CP2 of the PCB substrate 130 and the first and second electrodes 111 and 112 of the battery cells 110.

First to third isolated pads NP1, NP2, and NP3 may be provided on the first surface S1 of the PCB substrate 130 together with the first and second conductive pads CP1 and CP2. The first and second conductive pads CP1 and CP2, and the first to third isolated pads NP1, NP2, and NP3 may be arranged at different positions along the openings OP of the PCB substrate 130. Unlike the first and second conductive pads CP1 and CP2, the first to third isolated pads NP1, NP2, and NP3 are not connected to the conductive patterns 130P of the PCB substrate 130 and thus do not form the charge-discharge current path. As illustrated in FIGS. 5 and 7, the first to third isolated pads NP1, NP2, and NP3 are not connected to the first conductive section CS1 of the first surface S1 and the second conductive section CS2 of the second surface S2. That is, the first to third isolated pads NP1, NP2, and NP3 are not connected to the conductive patterns 130P of the PCB substrate 130.

Referring to FIG. 5, the first and second conductive pads CP1 and CP2 connected to the conductive patterns 130P of the PCB substrate 130 and forming the charge-discharge current path between the battery cells 110 and an external circuit (not shown) are arranged around the openings OP of the PCB substrate 130 in a direction of a first axis Zc, and the first and second isolated pads NP1 and NP2 not connected to the conductive patterns 130P of the PCB substrate 130 and not forming the charge-discharge current path between the battery cells 110 and an external circuit (not shown) are arranged around the openings OP of the PCB substrate 130 in a direction of a second axis Zn crossing the first axis Zc. As described above, the first and second conductive pads CP1 and CP2 and the first and second isolated pads NP1 and NP2 that are provided on the first surface S1 may be arranged around the openings OP of the PCB substrate 130 at different positions in an alternating manner in crossing directions. That is, since the first and second conductive pads CP1 and CP2 are electrically connected to the first and second electrodes 111 and 112 having different polarities, the first and second conductive pads CP1 and CP2 may be arranged at a distance from each other around the openings OP of the PCB substrate 130, diagonally in the direction of the first axis Zc. In this case, the first and second isolated pads NP1 and NP2 may be arranged in the direction of the second axis Zn crossing the first axis Zc to efficiently use the area of the PCB substrate 130.

Referring to FIG. 4, a first conductive portion 141c of each of the first electrode tabs 141 is connected to the first conductive pad CP1, and a second conductive portion 142c of each of the second electrode tabs 142 is connected to the second conductive pad CP2. Since the first and second conductive pads CP1 and CP2 are arranged on the first surface S1 of the PCB substrate 130 diagonally in the direction of the first axis Zc, the first and second conductive portions 141c and 142c may also be arranged around the opening OP of the PCB substrate 130 diagonally in the direction of the first axis Zc.

Similarly, a first fixing portion 141n of each of the first electrode tabs 141 may be connected to the first isolated pad NP1, and a second fixing portion 142n of each of the second electrode tabs 142 may be connected to the second isolated pad NP2. Since the first and second isolated pads NP1 and NP2 are arranged on the first surface S1 of the PCB substrate 130 diagonally in the direction of the second axis Zn, the first and second fixing portions 141n and 142n may also be arranged around the opening OP of the PCB substrate 130 diagonally in the direction of the second axis Zn.

The first and second electrode tabs 141 and 142 are intermediate parts for electrical connection between the PCB substrate 130 and the battery cells 110. In an embodiment, portions of the first and second electrode tabs 141 and 142 may be soldered to the first and second conductive pads CP1 and CP2 of the PCB substrate 130, and other portions of the first and second electrode tabs 141 and 142 may be welded to the first and second electrodes 111 and 112 of the battery cells 110.

In an embodiment, the first and second electrode tabs 141 and 142 may be connected by coupling the first and second electrode tabs 141 and 142 to the PCB substrate 130, and then coupling the first and second electrode tabs 141 and 142 coupled to the PCB substrate 130 to the battery cells 110. That is, connection between the first and second electrode tabs 141 and 142 and the PCB substrate 130, and connection between the first and second electrode tabs 141 and 142 and the battery cells 110 may be sequentially made through different processes.

For example, the first and second electrode tabs 141 and 142 may be first soldered to the first and second conductive pads CP1 and CP2 of the PCB substrate 130, and then the first and second electrode tabs 141 and 142 soldered to the PCB substrate 130 may be superposed on the first and second electrodes 111 and 112 provided on the upper end portions 110u of the battery cells 110. Thereafter, in a state in which the first and second electrode tabs 141 and 142 are vertically aligned with the first and second electrodes 111 and 112, the first and second electrode tabs 141 and 142 may be welded (e.g., laser welded) to the first and second electrodes 111 and 112. That is, after primary soldering the first and second electrode tabs 141 and 142 and the PCB substrate 130, the PCB substrate 130 may be superposed onto the upper end portions 110u of the battery cells 110, and the first and second electrode tabs 141 and 142 and the first and second electrodes 111 and 112 aligned with each other may be welded together.

In an embodiment, each of the first electrode tabs 141 may include: a central first coupling portion 141e configured to be coupled to the first electrode 111 of the battery cell 110; and the first conductive portion 141c extending from the central first coupling portion 141e toward the PCB substrate 130 (toward the first conductive pad CP1 of the PCB substrate 130). The first electrode tab 141 may serve as a medium for electrical connection between the first electrode 111 and the PCB substrate 130 by using the central first coupling portion 141e and the first conductive portion 141c. Similarly, each of the second electrode tabs 142 may include: a central second coupling portion 142e configured to be coupled to the second electrode 112 of the battery cell 110; and the second conductive portion 142c extending from the central second coupling portion 142e toward the PCB substrate 130 (toward the second conductive pad CP2 of the PCB substrate 130). The second electrode tab 142 may serve as a medium for electrical connection between the second electrode 112 and the PCB substrate 130 by using the central second coupling portion 142e and the second conductive portion 142c.

Each of the first electrode tabs 141 may further include the first fixing portion 141n radially extending from the central first coupling portion 141e toward the PCB substrate 130 together with the first conductive portion 141c. The first conductive portion 141c and the first fixing portion 141n may radially extend from different positions of the central first coupling portion 141e and may be coupled to different positions of the PCB substrate 130. Similarly, each of the second electrode tabs 142 may further include the second fixing portion 142n extending (e.g., radially extending) from the central second coupling portion 142e toward the PCB substrate 130 together with the second conductive portion 142c. The second conductive portion 142c and the second fixing portion 142n may extend (e.g., radially extend) from different positions of the central second coupling portion 142e and may be coupled to different positions of the PCB substrate 130. That is, the first and second electrode tabs 141 and 142 may respectively include the first and second conductive portions 141c and 142c and the first and second fixing portions 141n and 142n extending at different angles from different positions of the central first and second coupling portions 141e and 142e toward the PCB substrate 130. Each of the first and second electrode tabs 141 and 142 may be physically coupled to two different positions of the PCB substrate 130 through the first and second conductive portions 141c and 142c and the first and second fixing portions 141n and 142n.

The first and second conductive portions 141c and 142c physically electrically connect the first and second electrode tabs 141 and 142 to the PCB substrate 130, and, to this end, the first and second conductive portions 141c and 142c may be respectively connected to the first and second conductive pads CP1 and CP2 of the PCB substrate 130. Here, the first and second conductive pads CP1 and CP2 of the PCB substrate 130 are included in the conductive patterns 130P and may form the charge-discharge current path through the conductive patterns 130P.

Unlike the first and second conductive portions 141c and 142c, the first and second fixing portions 141n and 142n may physically connect the first and second electrode tabs 141 and 142 to the PCB substrate 130 and may be respectively coupled to the first and second isolated pads NP1 and NP2 of the PCB substrate 130. Here, the first and second isolated pads NP1 and NP2 of the PCB substrate 130 may not be connected to the conductive patterns 130P and may not form the charge-discharge current path on the PCB substrate 130. That is, the first and second isolated pads NP1 and NP2 of the PCB substrate 130 do not form electrical paths on the PCB substrate 130, and the first and second fixing portions 141n and 142n connected to the first and second isolated pads NP1 and NP2 align or fix the positions of the first and second electrode tabs 141 and 142 but do not form electrical connections for the first and second electrode tabs 141 and 142.

In a state in which the first and second electrode tabs 141 and 142 are primarily coupled to the PCB substrate 130, the first and second electrode tabs 141 and 142 may be coupled to the first and second electrodes 111 and 112 of the battery cell 110. In this case, the first and second electrode tabs 141 and 142 may be welded to the first and second electrodes 111 and 112 of the battery cell 110 in a state in which the first and second electrode tabs 141 and 142 coupled to the PCB substrate 130 are vertically aligned with the first and second electrodes 111 and 112 provided on the upper end portion 110u of the battery cell 110. At this time, the first and second conductive portions 141c and 142c and the first and second fixing portions 141n and 142n provided on both sides of the first and second electrode tabs 141 and 142 may facilitate aligning between the first and second electrode tabs 141 and 142 and the first and second electrodes 111 and 112 of the battery cell 110.

In the first and second electrode tabs 141 and 142, the first and second conductive portions 141c and 142c and the first and second fixing portions 141n and 142n may be provided at opposite positions of the central first and second coupling portions 141e and 142e. For example, the first and second conductive portions 141c and 142c and the first and second fixing portions 141n and 142n may be provided at mutually-facing positions of the central first and second coupling portions 141e and 142e. Here, the mutually-facing positions may include opposite positions, and may also include positions facing each other even though not being exactly opposite of each other.

The first and second conductive portions 141c and 142c and the first and second fixing portions 141n and 142n may extend (e.g., radially extend) from mutually-facing both sides of the central first and second coupling portions 141e and 142e and may be coupled to the PCB substrate 130. Since the first and second conductive portions 141c and 142c and the first and second fixing portions 141n and 142n are provided at mutually-facing positions, the first and second electrode tabs 141 and 142 may be aligned and securely fixed in position using the mutually-facing first and second conductive portions 141c and 142c and first and second fixing portions 141n and 142n.

When the PCB substrate 130 to which the first and second electrode tabs 141 and 142 are coupled is aligned with the upper end portion 110u of the battery cell 110, the central first and second coupling portions 141e and 142e of the first and second electrode tabs 141 and 142 are vertically aligned with the first and second electrodes 111 and 112. At this time, since the positions of the central first and second coupling portions 141e and 142e are securely fixed due to the first and second conductive portions 141c and 142c and the first and second fixing portions 141n and 142n provided on both sides of the central first and second coupling portions 141e and 142e, the central first and second coupling portions 141e and 142e may be easily aligned with the first and second electrodes 111 and 112.

In an embodiment, the central first coupling portion 141e may have a circular shape corresponding to the first electrode 111 of the battery cell 110, and the first conductive portion 141c and the first fixing portion 141n may extend from opposite positions of the central first coupling portion 141e having a circular shape toward the PCB substrate 130 in opposite directions.

In an embodiment, the central second coupling portion 142e may have a circular arc shape corresponding to the second electrode 112 of the battery cell 110, and the second conductive portion 142c and the second fixing portion 142n may extend in a circular arc shape from mutually-facing positions of the central second coupling portion 142e having a circular arc shape toward the PCB substrate 130.

The first and second conductive pads CP1 and CP2 for coupling with the first and second conductive portions 141c and 142c, and the first and second isolated pads NP1 and NP2 for coupling with the first and second fixing portions 141n and 142n may be provided on the PCB substrate 130.

The first conductive pad CP1 and the first isolated pad NP1 may be provided at mutually-facing positions of each of the openings OP of the PCB substrate 130. Similarly, the second conductive pad CP2 and the second isolated pad NP2 may be provided at mutually-facing positions of each of the openings OP of the PCB substrate 130.

The plurality of openings OP respectively corresponding to the upper end portions 110u of the battery cells 110 may be formed in the PCB substrate 130. The PCB substrate 130 may be coupled to the first and second electrodes 111 and 112 of the battery cells 110 through the first and second electrode tabs 141 and 142 extending through the openings OP.

The first and second electrode tabs 141 and 142 may serve as media for coupling the first and second electrodes 111 and 112 of each of the battery cells 110 to the PCB substrate 130. Here, the first electrode tab 141 may serve as a medium for coupling the first electrode 111 of the battery cell 110 to the PCB substrate 130, and, to this end, the first electrode tab 141 may include the first conductive portion 141c and the first fixing portion 141n provided on both sides of the central first coupling portion 141e. The central first coupling portion 141e is coupled to the first electrode 111 provided in a center region of the upper end portion 110u of the battery cell 110, and, in an embodiment, the central first coupling portion 141e may have a circular shape similar to the shape of the first electrode 111.

The second electrode tab 142 may serve as a medium for coupling the second electrode 112 of the battery cell 110 to the PCB substrate 130, and, to this end, the second electrode tab 142 may include the second conductive portion 142c and the second fixing portion 142n provided on both sides of the central second coupling portion 142e. The central second coupling portion 142e is coupled to the second electrode 112 provided along an edge region of the upper end portion 110u of the battery cell 110, and, in an embodiment, the central second coupling portion 142e may have a circular arc shape similar to the shape of the second electrode 112.

In an embodiment, the second electrode tab 142 may further include a third fixing portion 142m in addition to the second fixing portion 142n. For example, the second and third fixing portions 142n and 142m may extend (e.g., radially extend) from different positions of the central second coupling portion 142e and may be respectively coupled to the second and third isolated pads NP2 and NP3.

The second electrode tab 142 is coupled to the second electrode 112 provided along an edge region of the battery cell 110, and since a coupling area between the second electrode tab 142 and the second electrode 112 is relatively narrow, coupling strength may be supplemented by securely coupling the second electrode tab 142 to the PCB substrate 130 using the second and third fixing portions 142n and 142m.

The second fixing portion 142n may face the second conductive portion 142c and may extend from a position of the central second coupling portion 142e facing the second conductive portion 142c. The third fixing portion 142m may be provided at a middle position between the second fixing portion 142n and the second conductive portion 142c and may extend from the central second coupling portion 142e at the middle position between the second fixing portion 142n and the second conductive portion 142c.

In the second electrode tab 142, all of the second conductive portion 142c, the second fixing portion 142n, and the third fixing portion 142m may have a function of fixing the position of the second electrode tab 142 to the PCB substrate 130 and may securely fix the position of the second electrode tab 142 by providing balanced support at different positions.

The third fixing portion 142m may be connected to the third isolated pad NP3 (an additional isolated pad) of the PCB substrate 130, and the third isolated pad NP3 is not connected to the conductive patterns 130P of the PCB substrate 130 and does not form the charge-discharge current path between the battery cell 110 and an external circuit (not shown). Like the second fixing portion 142n, the third fixing portion 142m connected to the third isolated pad NP3 may not be electrically connected to the PCB substrate 130 but only physically coupled to the PCB substrate 130.

Since the second electrode tab 142 is securely fixed to the PCB substrate 130 through the second conductive portion 142c, the second fixing portion 142n, and the third fixing portion 142m provided at different positions, the central second coupling portion 142e of the second electrode tab 142 may be more easily aligned with the second electrode 112 provided along the edge region of the upper end portion 110u of the battery cell 110.

In an embodiment, each of the first and second electrode tabs 141 and 142 may be provided as one piece. For example, in the first electrode tab 141, the central first coupling portion 141e, and the first conductive portion 141c and the first fixing portion 141n provided on both sides of the central first coupling portion 141e may be connected to each other in a seamless manner. Similarly, in an embodiment, in the second electrode tab 142, the central second coupling portion 142e, the second conductive portion 142c and the second fixing portion 142n provided on both sides of the central second coupling portion 142e, and the third fixing portion 142m provided between the second conductive portion 142c and the second fixing portion 142n may be connected to each other in a seamless manner.

The first electrode tab 141 and the second electrode tab 142 may include deformation portions bc1, bn1, bc2, and bn2 each having one or more bent portions for compression/extension. In the first electrode tab 141, the first conductive portion 141c and the first fixing portion 141n provided on both sides of the central first coupling portion 141e may respectively include the deformation portions bc1 and bn1 each having one or more bent portions. Similarly, in the second electrode tab 142, the second conductive portion 142c and the second fixing portion 142n provided on both sides of the central second coupling portion 142e may respectively include the deformation portions bc2 and bn2 each having one or more bent portions.

In an embodiment, unlike the second conductive portion 142c and the second fixing portion 142n, the third fixing portion 142m provided between the second conductive portion 142c and the second fixing portion 142n may not include a bent portion. However, in another embodiment, the third fixing portion 142m may include a deformation portion having one or more bent portions.

The first and second electrode tabs 141 and 142 may serve as media for connection between the first and second electrodes 111 and 112 of the upper end portion 110u of the battery cell 110 and the PCB substrate 130, and may include the deformation portions bc1, bn1, bc2, and bn2 to absorb slight positional variations or vibrations between the battery cell 110 and the PCB substrate 130 while undergoing extension/compression and may securely maintain connection between the battery cell 110 and the PCB substrate 130. Each of the deformation portions bc1, bn1, bc2, and bn2 may include at least one or more bent portions and may undergo extension/compression while being deformed in directions in which the bent portions are folded or unfolded, thereby providing a flexible connection between the battery cell 110 and the PCB substrate 130.

The PCB substrate 130 may include the first and second surfaces S1 and S2 opposite each other in a thickness direction (e.g., corresponding to a vertical direction), and the first surface S1 (corresponding to an upper surface of the PCB substrate 130) may be more distant relative to the second surface S2 from the upper end portion 110u of each of the battery cells 110 on which the first and second electrodes 111 and 112 are provided. The openings OP may be formed at positions of the PCB substrate 130 corresponding to the upper end portions 110u, and the first and second electrodes 111 and 112 on the upper end portions 110u of the battery cells 110 may be exposed. The first and second electrode tabs 141 and 142 may penetrate each of the openings OP of the PCB substrate 130 through which the first and second electrodes 111 and 112 are exposed, and may extend to and be coupled to the first surface S1 of the PCB substrate 130. For example, the first conductive portion 141c and the first fixing portion 141n of the first electrode tab 141 may penetrate the opening OP of the PCB substrate 130 and may be coupled to the first conductive pad CP1 and the first isolated pad NP1. The second conductive portion 142c, the second fixing portion 142n, and the third fixing portion 142m of the second electrode tab 142 may penetrate the opening OP of the PCB substrate 130 and may be coupled to the second conductive pad CP2, the second isolated pad NP2, and the third isolated pad NP3. The first conductive portion 141c and the first fixing portion 141n of the first electrode tab 141, and the second conductive portion 142c, the second fixing portion 142n, and the third fixing portion 142m of the second electrode tab 142 may be coupled to non-overlapping positions of the PCB substrate 130 around the opening OP to prevent overlapping with each other. For example, the first conductive pad CP1, the first isolated pad NP1, the second conductive pad CP2, the second isolated pad NP2, and the third isolated pad NP3 may be provided at non-overlapping positions around the opening OP of the PCB substrate 130.

In an embodiment, the first and second electrodes 111 and 112 of each of the battery cells 110 are electrically connected to the first and second conductive pads CP1 and CP2 provided on the first surface S1 of the PCB substrate 130. That is, the first and second electrodes 111 and 112 of the battery cell 110 having different polarities are connected to the first and second conductive pads CP1 and CP2 provided on the same first surface S1 of the PCB substrate 130.

In a comparative example for comparison with the above-described embodiment, the first and second electrodes 111 and 112 of each of the battery cells 110 may be electrically connected to different conductive layers (not shown) provided at different levels. That is, in the comparative example, the first and second electrodes 111 and 112 of each of the battery cells 110 may be electrically connected to first and second conductive layers (not shown) stacked on each other at different levels, and, to this end, an insulative layer (not shown) may be placed between the first and second conductive layers (not shown) having different polarities. In the comparative example, the different first and second conductive layers (not shown) are provided above the upper end portion 110u of each of the battery cells 110 with the insulative layer (not shown) being placed between the first and second conductive layers for electrical insulation therebetween, thereby complicating the electrical connection structure therebetween, requiring strict process control or a complex structure for connecting the different first and second layers (not shown) overlapping each other respectively to the first and second electrodes 111 and 112 while insulting the first and second layers from each other, and increasing the possibility of a short circuit between the different polarities.

In an embodiment of the present disclosure, each of the battery cells 110 and the PCB substrate 130 are electrically connected to each other by connecting the first and second electrodes 111 and 112 of the battery cell 110 respectively to the first and second conductive pads CP1 and CP2 provided at different positions of the same first surface S1 of the PCB substrate 130, thereby easily insulating the first and second electrodes 111 and 112 from each other and decreasing the possibility of a short circuit. Therefore, the battery cell 110 and the PCB substrate 130 may be easily electrically connected to each other.

Referring to FIG. 5, in an embodiment, in the first electrode tab 141, the first conductive portion 141c and the first fixing portion 141n provided on both sides of the central first coupling portion 141e may have different widths Wc1 and Wn1. That is, the first conductive portion 141c connected to the conductive patterns 130P of the PCB substrate 130 to form the charge-discharge current path between the battery cells 110 and an external circuit (not shown) may have a width Wc1 smaller than a width Wn1 of the first fixing portion 141n not connected to the conductive patterns 130P of the PCB substrate 130 and not forming the charge-discharge current path. Since the first conductive portion 141c has the width Wc1 smaller than the width Wn1 of the first fixing portion 141n, the first conductive portion 141c may function as a fuse for interrupting overcurrent while being melted and cut by Joule heating in a case of overcurrent. Similarly, in an embodiment, in the second electrode tab 142, the second conductive portion 142c and the second fixing portion 142n provided on both sides of the central second coupling portion 142e may have different widths Wc2 and Wn2. That is, the second conductive portion 142c connected to the conductive patterns 130P of the PCB substrate 130 to form the charge-discharge current path between the battery cells 110 and an external circuit (not shown) may have a width Wc2 smaller than a width Wn2 of the second fixing portion 142n not connected to the conductive patterns 130P of the PCB substrate 130 and not forming the charge-discharge current path. Since the second conductive portion 142c has the width Wc2 smaller than the width Wn2 of the second fixing portion 142n, the second conductive portion 142c may function as a fuse for interrupting overcurrent while being melted and cut by Joule heating in a case of overcurrent. In an embodiment, the second conductive portion 142c may have the width Wc2 smaller than the width Wn2 of the second fixing portion 142n and a width of the third fixing portion 142m as well, and the second electrode tab 142 may be narrowest at the second conductive portion 142c having the width Wc2.

As described above, according to one or more embodiments, different polarities of the battery cells are connected to different conductive pads provided on the same surface of the PCB substrate, and, thus, the battery cells may have a simple electrical connection structure.

In addition, according to one or more embodiments, the electrode tabs serving as media for electrical connection between the battery cells and the PCB substrate may be securely fixed and easily aligned with the battery cells because balanced support is possible due to the conductive portions provided for electrical connection with the PCB substrate and the fixing portions provided for physical coupling with the PCB substrate.

It should be understood that embodiments described herein should be considered in a descriptive sense only and not for purposes of limitation. Descriptions of features or aspects within each embodiment should typically be considered as available for other similar features or aspects in other embodiments.

While one or more embodiments have been described with reference to the figures, it will be understood by those of ordinary skill in the art that various changes in form and details may be made therein without departing from the spirit and scope as set forth by the following claims.

What is claimed is:

1. A battery pack comprising:
   a plurality of battery cells;
   a printed circuit board (PCB) substrate electrically connected to the plurality of battery cells and comprising first and second surfaces opposite each other; and
   first and second electrode tabs electrically connecting a respective battery cell of the plurality of battery cells to the PCB substrate, the first and second electrode tabs being respectively connected to conductive pads having different polarities and located on the first surface of the PCB substrate,
   wherein the first and second electrode tabs respectively comprise:
   first and second coupling portions respectively coupled to first and second electrodes of the respective battery cell;
   first and second conductive portions extending from the first and second coupling portions toward the PCB substrate and respectively connected to the conductive pads having different polarities; and
   first and second fixing portions extending from the first and second coupling portions and respectively coupled to different isolated pads of the PCB substrate.

2. The battery pack of claim 1, wherein the conductive pads form portions of conductive patterns of the PCB substrate forming a charge-discharge current path of the respective battery cell.

3. The battery pack of claim 2, wherein the conductive patterns of the PCB substrate comprise the conductive pads located on the first surface, a conductive section located on the second surface, and vias penetrating the PCB substrate to connect at least one of the conductive pads on the first surface to the conductive section on the second surface.

4. The battery pack of claim 3, wherein the PCB substrate comprises a rigid insulative substrate supporting the conductive patterns located on the first and second surfaces.

5. The battery pack of claim 1, wherein the isolated pads are located on the first surface of the PCB substrate.

6. The battery pack of claim 5, wherein the isolated pads do not form a charge-discharge current path of the respective battery cell.

7. The battery pack of claim 5, wherein the first conductive portion and the first fixing portion radially extend from mutually-facing positions of the first coupling portion toward the PCB substrate.

8. The battery pack of claim 7, wherein the first conductive portion and the first fixing portion extend from opposite positions of the first coupling portion and extend toward the PCB substrate in opposite directions.

9. The battery pack of claim 5, wherein the first electrode tab further comprises a deformation portion comprising one or more bent portions on at least one of the first conductive portion and the first fixing portion.

10. The battery pack of claim 5, wherein the first conductive portion and the first fixing portion extend to and are coupled to the first surface of the PCB substrate through an opening of the PCB substrate through which the first and second electrodes of the respective battery cell are exposed.

11. The battery pack of claim 5, wherein the second conductive portion and the second fixing portion extend from mutually-facing positions of the second coupling portion toward the PCB substrate.

12. The battery pack of claim 5, wherein the second electrode tab further comprises a third fixing portion extending from the second coupling portion and coupled to the first surface of the PCB substrate, the third fixing portion being between the second conductive portion and the second fixing portion.

13. The battery pack of claim 12, wherein an additional isolated pad is located on the first surface of the PCB substrate between the conductive pad to which the second conductive portion is connected and the isolated pad to which the second fixing portion is coupled, and
   the third fixing portion is coupled to the additional isolated pad of the PCB substrate.

14. The battery pack of claim 13, wherein the additional isolated pad does not form a charge-discharge current path of the respective battery cell.

15. The battery pack of claim 12, wherein the second conductive portion, the second fixing portion, and the third fixing portion extend from different positions of the second coupling portion toward the PCB substrate.

16. The battery pack of claim 12, wherein the second electrode tab further comprises a deformation portion comprising one or more bent portions on at least one of the second conductive portion, the second fixing portion, and the third fixing portion.

17. The battery pack of claim 12, wherein the second conductive portion, the second fixing portion, and the third fixing portion extend to and are coupled to the first surface of the PCB substrate through an opening of the PCB substrate through which the first and second electrodes of the respective battery cell are exposed.

18. The battery pack of claim 1, wherein the first surface of the first and second surfaces of the PCB substrate which are opposite each other in a thickness direction of the PCB substrate is more distant relative to the second surface from upper end portions of the battery cells on which first and second electrodes are located.

19. The battery pack of claim 1, wherein the battery cells comprise upper and lower end portions opposite each other,
- the PCB substrate faces the upper end portions of the battery cells on which first and second electrodes are located, and
- the battery pack further comprises a cooling member at a position facing the lower end portions of the battery cells.

* * * * *